Aug. 1, 1939.  D. H. GILLHAM ET AL  2,167,944

WASHER

Filed Dec. 21, 1936  2 Sheets-Sheet 1

INVENTORS
Daniel H. Gillham
Grover H. Meade
John A. Naismith
ATTORNEY

Aug. 1, 1939.　　　D. H. GILLHAM ET AL　　　2,167,944
WASHER
Filed Dec. 21, 1936　　　2 Sheets-Sheet 2
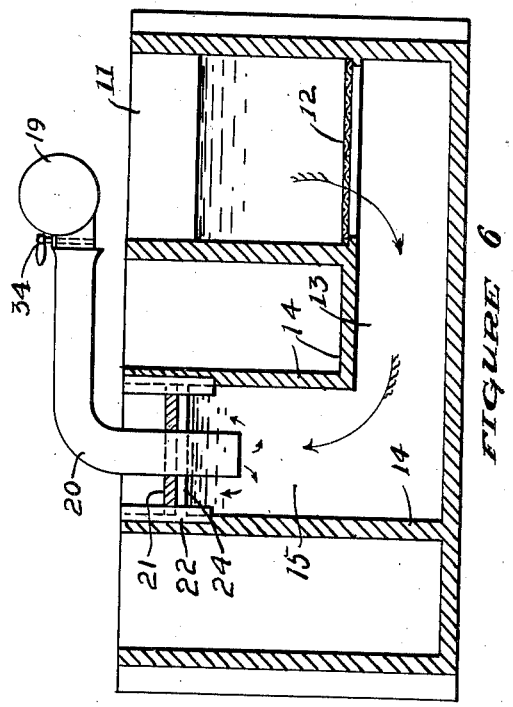
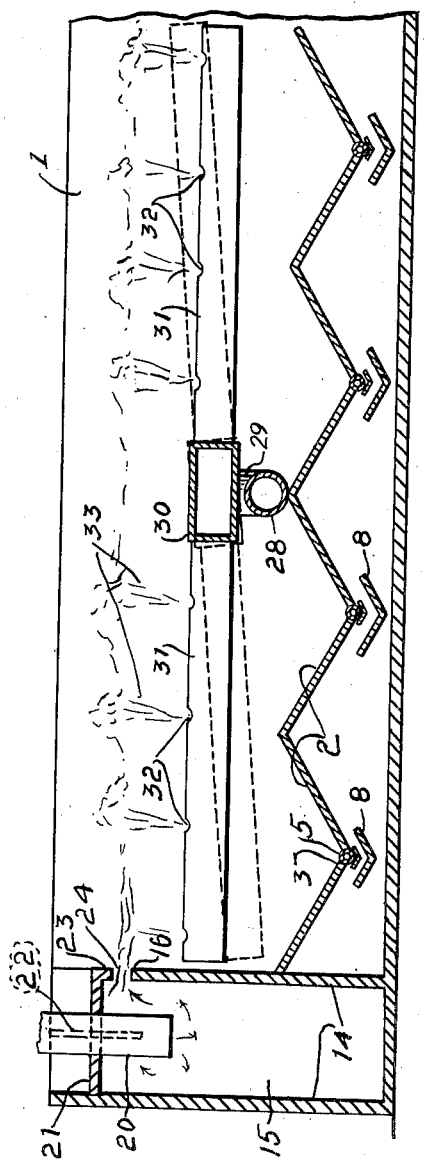
INVENTORS
Daniel H. Gillham
Grover H. Meade
John A. Naismith
ATTORNEY Patented Aug. 1, 1939

2,167,944

UNITED STATES PATENT OFFICE 2,167,944

WASHER

Daniel H. Gillham and Grover H. Meade, San Jose, Calif.; said Meade assignor to said Gillham Application December 21, 1936, Serial No. 117,023

6 Claims. (Cl. 146—194)

The present invention relates particularly to a machine for washing fruits and vegetables, and more particularly to a machine for washing vegetables such as carrots.

In harvesting carrots and preparing same for packing preparatory to shipment it has been the custom to pull the carrots from soft muddy ground, tie them in bunches as they are pulled, and subsequently transport them to the washing sheds where they are cleaned and packed.

Since carrots freshly removed from the ground are extremely brittle they are easily broken if the bunches are immediately thrown into crates, trucked to the sheds, and put through the customary washing process, therefore they are thrown upon the ground and allowed to wilt somewhat before the succeeding steps are taken.

While this wilting process prevents breakage it also has the effect of loosening the foliage in the ties, permitting the several carrots in a single bunch to slide relative to each other and form an irregular drawn-out bunch instead of the short compact bunch desired and which the trade demands. Furthermore, this wilting process permits the mud to dry and cake between the carrots and in the foliage, rendering it extremely difficult to remove in washing.

If the bunched carrots are removed immediately to the washing shed without being subjected to the drying process they are not only subject to breakage as hereinbefore set forth but the compact solid bunch renders it difficult to wash out all of the soil trapped in the bunch and filling the voids between the several carrots and the bases of the carrot tops.

It is one object of the present invention to provide a machine that will effectually wash the carrots or articles clean without injury thereto, and permit the washing of bunched carrots immediately upon harvesting.

It is another object of the invention to provide a carrot washing machine that will conserve the water used and permit foreign matter removed from the carrots to be quickly and easily disposed of without material loss of time.

It is also an object of the invention to provide a machine of the character indicated that will be economical to manufacture, simple in form and construction, practical, durable, and highly efficient in its practical application.

In the drawings:

Figure 5 is an enlarged section on line 5—5 of Figure 1.

Figure 6 is an enlarged section on line 6—6 of Figure 1.

Figure 1:
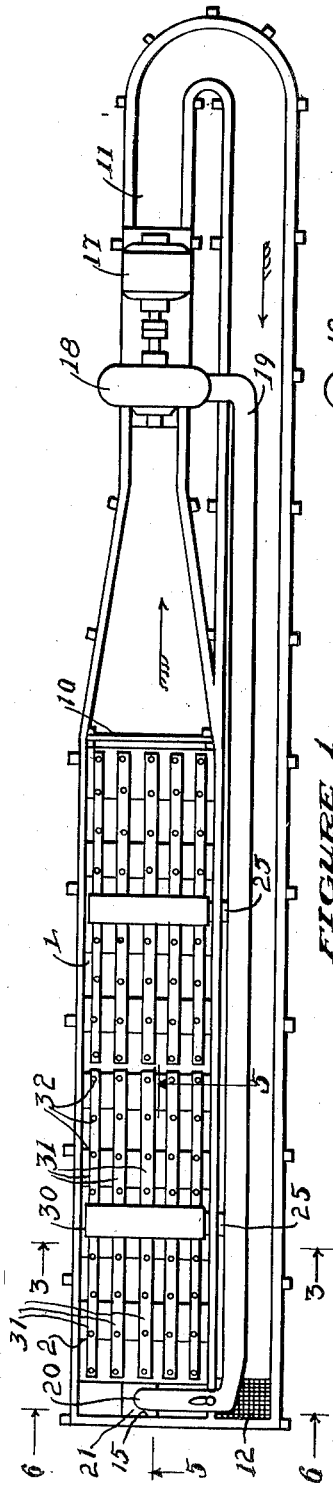
Figure 1 is a plan view of a machine embodying our invention.
Figure 2:
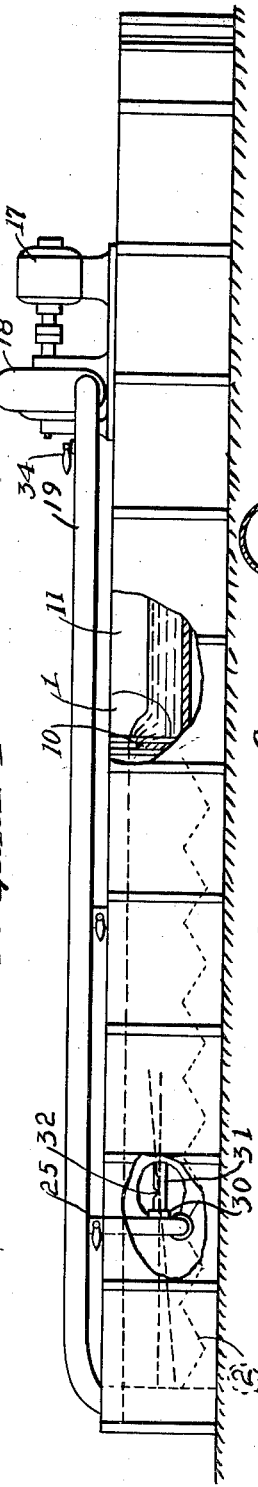
Figure 2 is a side elevation of the same with parts broken away.
Figure 3:
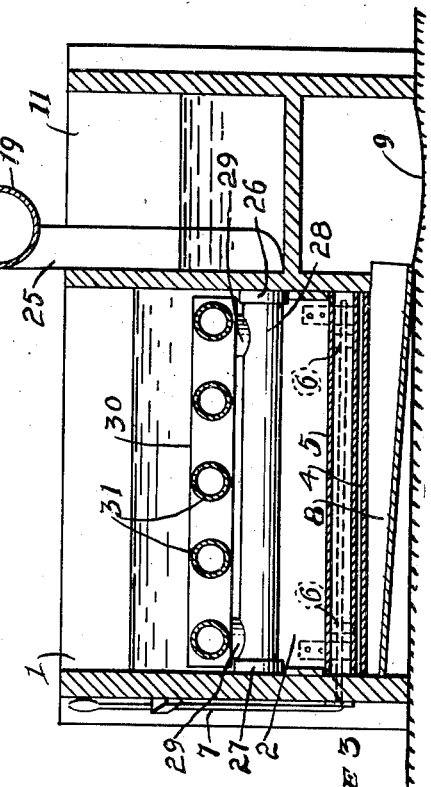
Figure 3 is an enlarged section on line 3—3 of Figure 1.
Figure 4:
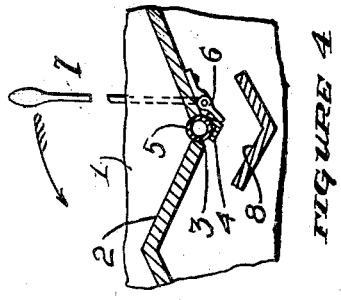
Figure 4 is an enlarged section through a portion of the bottom of the wash tank.

Considering now the construction of the particular embodiment of the invention shown, 1 indicates the main wash tank of any desired length and having its bottom formed of a number of transversely extending V shaped troughs as 2. Through the bottom of each trough is formed a slot 3 normally closed by a rubber pipe section 5 disposed in a supporting angle-iron bar 4. The bar 4 is hinged on the bottom of the tank as at 6 whereby the pipe may be swung into or out of the normal closed position by a lever 7. Material discharged through the slots 3 falls into inclined troughs 8 and is discharged therefrom into a gutter or other receiver 9.

Water is discharged from tank 1 over a vertically adjustable end gate 10 into a long and relatively narrow trough 11 which turns back upon itself to parallel the tank 1 to discharge through a screen 12 into a laterally directed channel 13 at the receiving end of tank 1. This channel 13 is defined by walls as 14 which turn upwardly to form a well 15 in the median plane of the tank and discharging back into the tank 1 over a lip 16.

One feature of the invention is the development of a desired amount of turbulence in the water flowing through tank 1, and this is accomplished in the following manner.

Mounted on the walls of trough 11 is a motor 17 driving a blower fan 18. To the fan 18 is connected a conduit 19 passing rearwardly as shown and terminating in a flexible section 20. The section 20 is projected downwardly into the water in well 15 and is supported by a plate 21 through which it is slidably inserted, the plate forming a cover for the well and vertically adjustable therein by means of guides 22. The front edge of the plate has a lip 23 disposed in opposed relation to lip 16, the discharge passage 24 between the lips being regulated by moving the plate on the guides 22 where its frictional engagement is sufficient to hold it in place. The depth of the section 20 in the water may be regulated by proper adjustment in plate 21, and also by slidably adjusting the section in the plate.

By the operation of the motor and fan air is driven forcibly out of the pipe section 20 into the well 15, the water displaced being driven through passage 24 into the tank 1. The volume of water discharged into tank 1 is controlled by the vertical adjustment of the pipe end 20 in the well, and the velocity of its discharge is controlled by regulating the width of passage 24.

Connected to the conduit 19 are spaced lateral conduits 25, each conduit 25 extending downwardly on the outside of tank 1 and thence through the side wall as at 26. Rotatably mounted in the end of conduit terminal 26 and in a bearing 27 on the opposite wall of the tank, is a conduit section 28 communicating as at 29 with an overlying header section 30, the header carrying perforated pipes as 31.

The header 30 is rigidly mounted on the conduit section 28, and the several pipes 31 are rigidly mounted on the header 30 and parallel each other and the side walls of the tank 1 and extend both forwardly and rearwardly from the header in which they are mounted. The discharge orifice 32 may be of any desired size and they may be spaced as conditions indicate.

For the purpose of this disclosure it may be assumed that the conduit 28 is seated so snugly in its end supports that it, and the several parts mounted thereon, will remain in any position in which it is placed, but various devices may be provided for adjusting and supporting the structure in its adjusted position.

By means of the structure described above air may be forced upwardly through the water in the tank as indicated at 33 to create the desired turbulence therein. This turbulence may be controlled by air control valves such as at 34, but it may also be controlled distributed as desired by tilting the pipe and header structure 30—31. Obviously, when the structure 30—31 is in a normal horizontal position as shown in solid lines the turbulence created by the discharge of air will be substantially uniform throughout the whole body of water overlying the same. But if the structure is tilted as indicated in dotted lines, then there is a graduated intensity of turbulence from one end to the other. This graduated action may be desirable where carrots, for instance, are heavily caked with mud. Here the gentle manipulation will remove much of the mud which would be injurious to the carrots if agitated briskly when first deposited in the tank.

When the machine is in operation the carrots are deposited in the tank at the end adjacent the well 15 and are moved forwardly in the tank by the discharge of water through passage 24. As the carrots move forwardly they are tossed about by the turbulence created by the air jets 33, water being forced between them and into and through the mud clogged spaces between the tops and under the ties. Since the machine may be of any desired length the carrots may be subjected to this cleaning action for as long a period as may be desirable, after which they are discharged into the trough 11 from which they are removed for packing.

It is to be understood, of course, that while we have herein shown and described but one specific embodiment of the invention, changes in form, construction, and method of assembly and operation may be made within the scope of the appended claims without departing from the spirit of the invention.

We claim:

1. A washer for carrots and the like comprising, a water tank having a well at one end provided with a discharge outlet to the tank above the level of the water therein and an overflow discharge at its other end, a trough connecting the overflow and well, a source of fluid pressure, and a conduit leading said source into the well to force water to overflow from the well to the tank.

2. A washer for carrots and the like, comprising, a water tank having a well at one end provided with a discharge outlet to the tank above the level of the water therein and an overflow discharge at its other end, a trough connecting the overflow and well, a source of fluid pressure, a conduit leading from said source into the well to force water to overflow from the well to the tank, and branch conduits leading from said conduit into the tank below the overflow level and having upwardly directed jet forming orifices formed therein.

3. A washer for carrots and the like comprising, a water tank having a well at one end and overflowing into the same and an overflow discharge at the other end, a conduit connecting the overflow and lower portion of the well, a source of fluid pressure, a conduit leading from said source to a point below the water surface in the well and vertically adjustable relative thereto, a vertically adjustable cover for the well to form a variable discharge therefor, and branch conduits leading from said conduit into the tank below the overflow level and having upwardly directed jet forming orifices formed therein.

4. A washer for carrots and the like comprising, a water tank having a well at one end provided with a discharge outlet to the tank above the level of the water therein and an overflow discharge at the other end, a trough disposed to receive the overflow from the tank, and communicating with the lower portion of the well to discharge into the same, a conduit leading into the well between its inlet and overflow level, and a fluid-pressure generator disposed to force fluid through the conduit into the well to displace the water therein and cause it to overflow into the tank.

5. A washer for carrots and the like comprising, a wash tank having an overflow discharge outlet determining the water level in the tank, a well having an overflow discharge outlet disposed above the water level in the tank and to discharge into said tank, a water supply channel leading to the lower portion of the well to discharge thereinto, a trough constructed and arranged to receive the overflow from said tank and discharge the same into said channel, a conduit having a vertically adjustable discharge and extending downwardly into the well to a point intermediate the inlet channel and the discharge overflow, and a fluid-pressure generator disposed to force fluid through the conduit into the well to displace the water therein and cause it to overflow into the tank.

6. A washer for carrots and the like comprising, a trough, a wash tank having an overflow into the trough, a well provided with a discharge outlet to the tank above the level of the water therein, the trough having communication with and discharging into the bottom of the well, and instrumentalities operative to raise the level of the water in the well to the discharge outlet, and instrumentalities operative to control the flow of water through the outlet.

DANIEL H. GILLHAM.
GROVER H. MEADE.